United States Patent [19]

Emory, Jr.

[11] Patent Number: 4,807,386
[45] Date of Patent: Feb. 28, 1989

[54] DOWNRIGGER ACTUATOR

[75] Inventor: John E. Emory, Jr., Traverse City, Mich.

[73] Assignee: Big Jon, Inc., Traverse City, Mich.

[21] Appl. No.: 221,115

[22] Filed: Jul. 19, 1988

[51] Int. Cl.⁴ ............. A01K 91/00; A01K 91/06; A01K 97/10; A01K 97/12

[52] U.S. Cl. .................... 43/27.4; 43/15; 43/16; 43/21.2

[58] Field of Search ............. 43/43.12, 27.4, 21.2, 43/26.1, 20, 21, 15, 16

[56] References Cited

U.S. PATENT DOCUMENTS

| | | | |
|---|---|---|---|
| 2,786,296 | 3/1957 | Loebensteen | 43/43.12 |
| 3,193,964 | 7/1965 | Hurst | 43/43.12 |
| 3,719,331 | 3/1973 | Harsch | 43/43.12 |
| 3,835,571 | 9/1974 | Berry | 43/21 |
| 4,173,091 | 11/1979 | Emory, Jr. | 43/43.12 |
| 4,197,668 | 4/1980 | McKinsey | 43/15 |
| 4,248,002 | 2/1981 | McNellis | 43/27.4 |
| 4,274,219 | 6/1981 | Way | 43/43.12 |
| 4,376,350 | 3/1983 | Bednarz et al. | 43/27.4 |
| 4,378,652 | 4/1983 | Lindgren | 43/26.1 |
| 4,495,721 | 1/1985 | Emory, Jr. | 43/27.4 |
| 4,517,760 | 5/1985 | Randle | 43/21 |
| 4,610,409 | 9/1986 | Emory, Jr. | 43/27.4 |
| 4,641,453 | 2/1987 | Roberts, Sr. | 43/21.2 |

Primary Examiner—Nicholas P. Godici
Assistant Examiner—William Scott Andes
Attorney, Agent, or Firm—Price, Heneveld, Cooper, DeWitt & Litton

[57] ABSTRACT

Apparatus for automatically actuating a downrigger motor to reel in a downrigger line upon release of a fishing line or release of tension on the downrigger line includes a normally closed switch mounted on a fishing rod holder and engaged by the rod holder when the holder is in a set position. Upon movement of the rod holder from the set position to a strike position, the switch closes a circuit between a power source and downrigger motor. The motor is actuated to reel in the downrigger line.

14 Claims, 2 Drawing Sheets

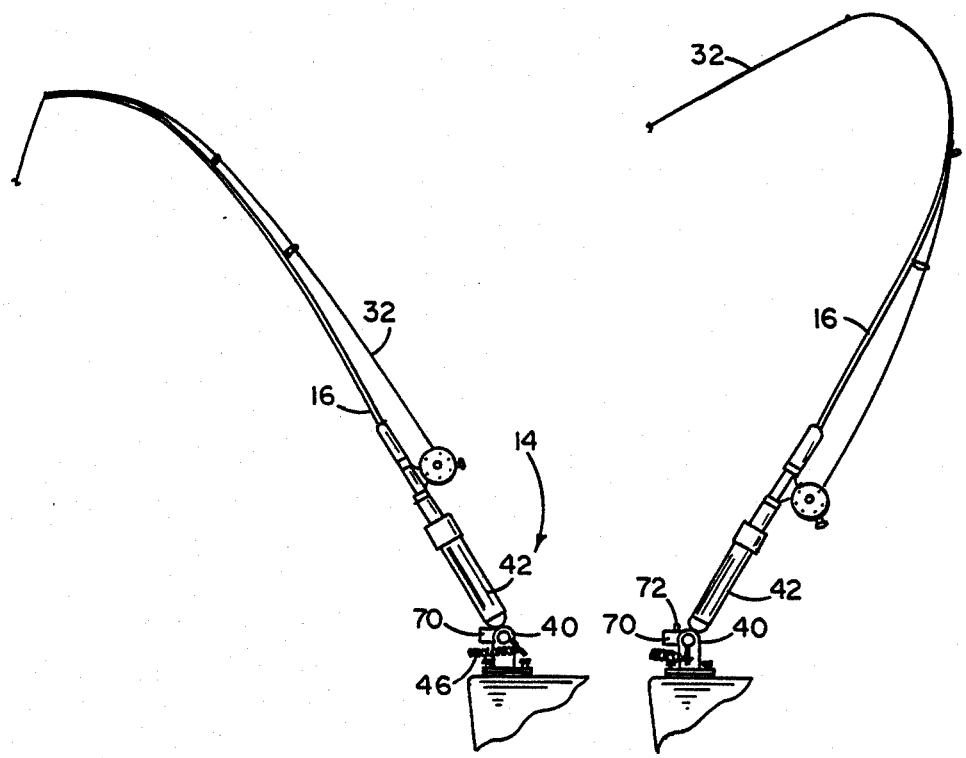

DOWNRIGGER ACTUATOR

BACKGROUND OF THE INVENTION

The present invention relates to fishing and boating equipment and more particularly to downrigger devices for maintaining the depth of a lure or bait attached to a fishing line when trolling.

Various systems have been proposed for ocean and lake trolling to maintain the lure or bait attached to a fishing line at a predetermined depth. Such systems include downriggers having a reel, a boom and a downrigger line. Secured to the end of the line is a weight or cannonball. The downrigger line also includes a fishing line release. An electric motor connected to a power source is actuated to raise and lower the downrigger line.

Generally, the fishing rod is held in a rod holder. With certain rod holders, the rod is positioned in a set position during trolling operations. Upon line release, the holder will shift to a strike position indicating line release and presenting the pole to the fisherman for easy removal from the rod holder. An example of such a rod holder assembly is found in commonly owned U.S. Pat. No. 4,495,721 entitled ROD HOLDER ASSEMBLY and issued on Jan. 29, 1985. Examples of downrigger assemblies may be found in commonly owned U.S. Pat. No. 4,610,409 entitled TIP UP RIGGER WITH TROLLEY SUBASSEMBLY and issued on Sept. 9, 1986; U.S. Pat. No. 3,193,964 entitled OUTRIGGER FISHING LINE GUIDE and issued on July 13, 1965 to Hurst; U.S. Pat. No. 3,719,331 entitled DOWNRIGGER and issued on Mar. 6, 1973 to Harsch; U.S. Pat. No. 4,248,002 entitled DOWNRIGGER SYSTEM and issued on Feb. 3, 1981 to McNellis; and U.S. Pat. No. 4,376,350 entitled AUTOMATIC DOWN RIGGER CONTROL SYSTEM and issued on Mar. 15, 1983 to Bednarz et al.

Upon fishing line release, the downrigger line must be reeled in. This is necessary to prevent tangling of the fishing line with the downrigger line and cannonball. Also, when trolling near the bottom, the cannonball may bump or bounce on the bottom as the water depth decreases The operator must raise the downrigger line to move the ball off the bottom.

A need exists for a device which will automatically retrieve the downrigger line and weight upon release of the fishing line and which will automatically adjust the position of the downrigger weight should it bump or drag on the bottom.

SUMMARY OF THE INVENTION

In accordance with the present invention, apparatus is provided for automatically retrieving the downrigger line upon fishing line release and for automatically reeling in the downrigger line to accommodate a reduction in depth and eliminate bumping or dragging of the cannonball on the bottom. Essentially, the apparatus includes actuator means which automatically moves from a set position towards a strike position upon release of a fishing line from a line release or upon release of tension on the downrigger line should the downrigger weight bump against or drag on the bottom. A control engaged by the actuator means electrically connects the electric motor of a downrigger assembly to a power source to automatically actuate the downrigger motor to reel in the downrigger line as the actuator means moves towards the strike position from the set position.

In narrower aspects of the invention, the actuator means includes a rod holder resiliently biased from a set position to a strike position. A normally closed microswitch is positioned adjacent the rod holder to be engaged thereby and held in the open position when the holder is in the set position. The microswitch is electrically connected between a power source and the electric downrigger motor. Upon line release, the rod holder moves under the resilient bias towards the strike position thereby closing the switch and actuating the downrigger motor. Upon temporary release of tension on the downrigger line, such as would occur when the downrigger weight or cannonball engages or drags on the bottom, the rod holder will move off of the set position and towards the strike position. This again actuates the electric downrigger motor. The motor will be deactuated when normal tension returns to the downrigger line and the rod holder moves to the set position.

The downrigger actuator in accordance with the present invention, therefore, automatically initiates retrieval of the downrigger line upon line release. This permits the operator to attend to the fishing pole and eliminates or reduces the chance that the fishing line will become entangled with the downrigger line. Also, the system in accordance with the present invention automatically retrieves or reels in downrigger line to move the downrigger weight or cannonball off of the bottom during trolling operations.

BRIEF DESCRIPTION OF THE DRAWINGS

FIG. 4 is a fragmentary, side elevational view showing a rod holder in a set position; and FIG. 5 is a fragmentary, elevational view showing the rod holder in a "strike" position.

DETAILED DESCRIPTION OF THE PREFERRED EMBODIMENT

Figure 1:
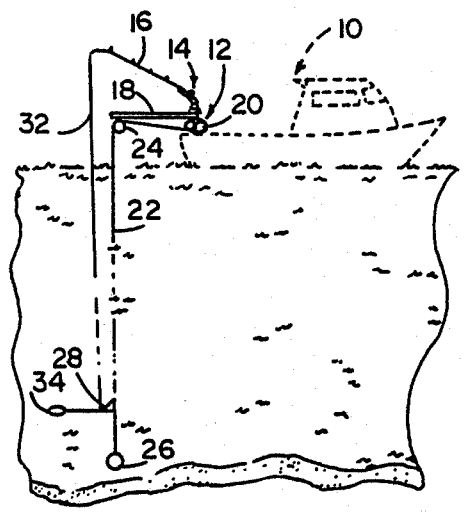
FIG. 1 is a side view of a fishing boat schematically illustrating a downrigger and rod holder usable with the present invention.
Figure 2:
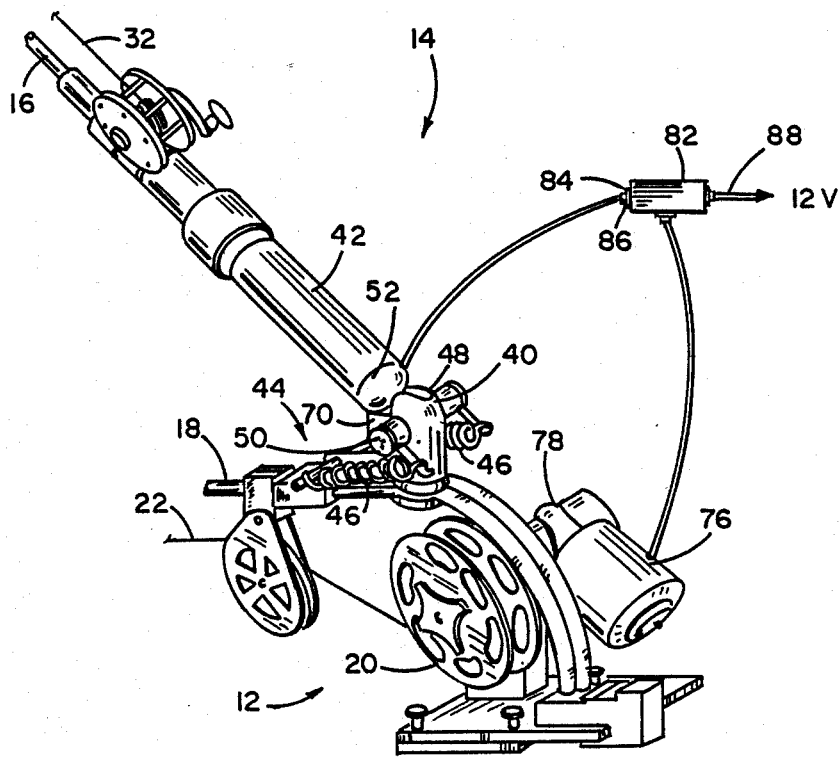
FIG. 2 is a perspective view of a fishing rod holder and downrigger assembly incorporating the actuator in accordance with the present invention.

A fishing boat designated by the numeral 10 and employing a downrigger and fishing rod holder which incorporates the present invention is illustrated in FIG. 1. Mounted on the transom of boat 10 is a downrigger subassembly 12. Positioned on or adjacent downrigger subassembly 12 is a fishing rod holder subassembly 14 supporting a fishing rod 16. As seen in FIGS. 1 and 2, downrigger subassembly 12 includes an elongated boom or arm 18 and a downrigger reel 20. A downrigger line 22 extends from reel 20 and over a pulley 24 supported on arm 18. A downrigger weight or cannonball 26 is suspended from line 22. Supported on line 22 is a fishing line release 28. Line release 28 is conventional and may be of the type illustrated in commonly owned U.S. Pat. No. 4,173,091 entitled DOWNRIGGER LINE RELEASE and issued on Nov. 6, 1979. A fishing line 32 extends from pole 16 and is releasably attached to line release 28. Secured to the end of fishing line 32 is a lure or bait 34. In normal operation, the operator attaches fishing line 32 to line release 28. Reel 20 is then turned to reel out the downrigger line 22 and position the weight 26 at the appropriate depth. As shown in FIG. 1, lure or bait 34 will be properly positioned during the trolling operation.

A rod holder assembly 14 in accordance with the present invention is illustrated in FIGS. 2, 4 and 5. As shown in FIG. 2, rod holder assembly 14 is mounted on the elongated arm 18 of the downrigger assembly 12. FIGS. 4 and 5 show assembly 14 mounted directly on the boat transom. Rod holder subassembly 14 is of the type illustrated in the aforementioned commonly owned U.S. Pat. No. 4,495,721. To the extent necessary, the disclosure of such patent is hereby incorporated by reference.

Rod holder 14 includes a base 40, a cylindrical rod holder member 42, a spring bracket 44 and springs 46. Base 40 includes a bifurcated upper portion 48. A pivot pin 50 extends through upper portion 48. The pivot pin supports a rod holder support member 52. Tubular rod holder 42 is in turn secured to the support 52. Fishing pole 16 is received within rod holder 42.

When the fishing line 32 is secured to line release 28 and the downrigger weight 26 is in a lowered or trolling position, holder 42 is pivoted against the resilient bias of springs 46 to a "set" position as illustrated in FIGS. 2 and 4. When the fishing line 32 releases from line release 28, holder member 42 will pivot clockwise under the resilient bias of springs 46 to the "strike" position illustrated in FIG. 5. Should the cannonball or weight 26 bounce off of the bottom (FIG. 1), tension on downrigger line 22 will be released. Rod holder member 42 will, therefore, pivot in a clockwise direction as viewed in FIGS. 4 and 5 under the resilient bias of springs 46. If the ball 26 is raised by reeling in the downrigger line 22, tension will be restored to the line and holder 42 will move back to the "set" position.

Figure 3:
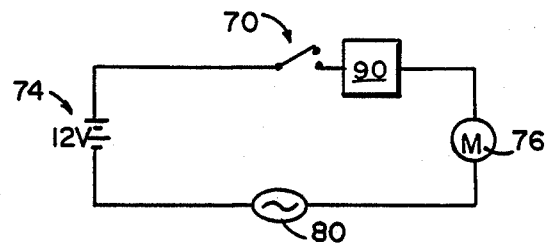
FIG. 3 is an electrical schematic of a control system incorporated in the present invention.

A control in accordance with the present invention is incorporated into the downrigger and rod holder subassemblies in order to automatically raise the downrigger line upon line release or upon dragging of the ball on the bottom. As illustrated in FIGS. 2, 4 and 5, a normally closed microswitch 70 is supported on base 40. As seen in FIGS. 4 and 5, microswitch 70 is positioned so that it is engaged by a lower portion of rod holder 42 or the rod holder support member 52 when the rod holder is in the set position. When the rod holder moves to the strike position, as shown in FIG. 5, rod holder 42 releases a plunger 72 of microswitch 70. Microswitch 70, as schematically illustrated in FIGS. 2 and 3, is wired in series between a power supply 74 and a downrigger motor 76. Downrigger motor 76 is operably connected to the downrigger reel 20 through a gear box 78. Also included in the control circuit is a fuse 80.

In the preferred form, switch 70 is electrically connected to motor 76 and power supply 74 through a connector box 82. Connector box 82 supports jack sockets 84. Sockets 84 receive quick disconnect jacks 86 which are electrically connected to switch 70 and motor 76. A line 88 runs from connector box 82 to the power source. Typically, the power source will be a 12 volt battery.

As schematically shown in FIG. 3, the control is readily adapted to provide a visual or aural indication at a remote location of fishing line release. An indicator 90, such as an L.E.D. readout, an alarm, or a voice synthesizer, is in the circuit downstream of switch 70 The indicator could identify the downrigger by number. The indicator can be mounted by the pilot. Upon line release, the indicator would identify the downrigger associated therewith. Typically, two to five or even more downriggers and fishing lines will be used when sport fishing. Incorporating the indicator will reduce confusion and permit fast identification of the appropriate fishing pole.

Operation

In operation, fishing rod holder 14 is secured to downrigger assembly 12, as shown in FIG. 2, or mounted on the transom of the boat adjacent the downrigger subassembly. Fishing rod 16 is positioned within tubular member 42. Fishing line 32 is secured to line release 28 supported on the downrigger line 22. The downrigger line is then played out to the predetermined depth desired by the fisherman and trolling commences. Holder member 42 will automatically pivot against the bias of springs 46 to a "set" position, as illustrated in FIGS. 2 and 4. When fishing line 32 releases from the downrigger line upon a strike, holder member 42 will pivot under the resilient bias of springs 46 back into the boat to a "strike" position, as illustrated in FIG. 5. As a result, rod holder member 42 will disengage from microswitch plunger 72. The switch 70, which has been held in the open position, will then move to its normally closed position. This completes the circuit between the power supply and the downrigger motor 76. Motor 76 is then actuated to rotate reel 20 and hence reel in the downrigger line 22. The fisherman may then tend to the pole 16. The system insures that retrieval of the downrigger line starts automatically to minimize or eliminate fouling of the fishing line 32 with the downrigger line and weight. Once the downrigger line has been reeled in a sufficient amount, the fisherman may disconnect motor 76 from the power source by removal of a quick disconnect jack from connector box 82. In the alternative, a separate manual switch on motor 76 may be flipped to stop the motor.

Should the fisherman be trolling with the weight adjacent the bottom and should the depth decrease, the weight would normally contact or bump against the bottom surface. This would release the tension on the downrigger line 22. This causes rod holder 42 to pivot towards the strike position from the set position and hence off of plunger 72 of switch 70. Downrigger motor 76 will again be actuated to raise the weight 26. Once weight 26 has cleared the bottom, tension will be restored to the downrigger line 22 and holder 42 will again pivot to the "set" position. This again opens the switch 70 stopping motor 76.

The system in accordance with the present invention automatically initiates downrigger retrieval upon a strike and automatically positions the downrigger weight should the weight bounce on the bottom surface. The system is relatively easily added to existing downrigger and rod holder systems. The problems heretofore experienced are eliminated or substantially alleviated.

In view of the foregoing description, various modifications to the present invention might be envisioned by those of ordinary skill in the art which would not depart from the inventive concepts disclosed herein. For example, rod holder subassemblies other than the one specifically illustrated could be employed. Any assembly which had a portion movable from a set to a strike position upon line release could be engaged by the control switch 70. Therefore, it is expressly intended that the above description should be considered as that of the preferred embodiment only. The true spirit and scope of the present invention may be determined by reference to the appended claims The embodiments of the invention in which an exclusive property or privilege is claimed are defined as follows:

1. Apparatus for automatically actuating a downrigger motor to reel in a downrigger line upon movement of a rod holder from a set position towards a strike position upon release of a fishing line from the downrigger line or upon temporary release of tension of the downrigger line, said apparatus comprising:
   a switch adapted to be mounted on a rod holder and held in an open position when the rod holder is in a set position;
   a source of electrical power; and
   means for connecting the source of electrical power to a downrigger motor through said switch so that said motor is actuated to reel in a downrigger line when the holder moves towards a strike position causing said switch to close.

2. Apparatus as defined by claim 1 wherein said means for connecting includes quick disconnect jacks for connecting and disconnecting said switch and said motor from said source of power.

3. Apparatus as defined by claim 1 further including a fuse electrically connected between said motor and said source of power.

4. Apparatus as defined by claim 1 further including an indicator connected to said switch for remotely indicating closure of said switch and identifying the holder.

5. Apparatus for trolling a fishing line, comprising:
   a rod holder assembly having a base, a rod holder member pivoted to said base and means engaging said rod holder for biasing said rod holder member towards a strike position from a set position;
   a downrigger assembly having a reel carrying a downrigger line, an electric motor connected to said reel for reeling out and retrieving said downrigger line and a weight connected to said downrigger line; and
   control means operatively engaging said rod holder member and connected to said electric motor for automatically actuating said motor to retrieve said downrigger line when said rod holder member moves from said set position to said strike position.

6. Apparatus as defined by claim 5 wherein said control means comprises:
   a switch mounted on said rod holder, said switch being electrically connected to said electric motor and positioned to be engaged by said rod holder when said rod holder is in said set position.

7. Apparatus as defined by claim 6 wherein said switch is a normally closed microswitch.

8. Apparatus as defined by claim 6 wherein said means for biasing said rod holder member includes a spring extending between said base and said rod holder member.

9. Apparatus as defined by claim 5 wherein said control means further includes a remote indicator for alerting a user that said rod holder has moved towards said strike position.

10. Apparatus mountable on a boat for trolling a fishing line at a desired depth, said apparatus comprising:
    a downrigger base;
    a downrigger reel rotatably mounted on said base and carrying a downrigger line;
    an electric motor connected to said reel;
    a fishing line release supported by said downrigger line;
    a weight secured to said downrigger line;
    a fishing rod holder means for holding a fishing rod, said holder means including actuator means for automatically moving from a set position to a strike position upon release of a fishing line and upon release of tension on the downrigger line; and
    control means on said rod holder means and electrically connected to said electric motor for automatically actuating said motor when said actuator means moves towards said strike position and automatically stops said motor when said actuator means moves to said set position.

11. Apparatus as defined by claim 10 wherein said rod holder means includes a base and said actuator means comprises:
    a rod holder member pivotally secured to said base; and
    spring means connected to said rod holder member for resiliently biasing said member from said set position towards said strike position.

12. Apparatus as defined by claim 11 wherein said control means comprises a switch on said base, said switch including a plunger engaged by said rod holder member when in said set position and released when said rod holder member moves towards said strike position.

13. Apparatus as defined by claim 10 wherein said control means includes a remote indicator for automatically indicating to a user that release of a fishing line has occurred.

14. Apparatus as defined by claim 12 wherein said control means includes a remote indicator for automatically indicating to a user that release of a fishing line has occurred.

* * * * *